United States Patent
Hammerstrom et al.

(10) Patent No.: US 9,371,115 B2
(45) Date of Patent: Jun. 21, 2016

(54) QUICK DETACHABLE FIN HOLD SYSTEM

(71) Applicants: Wade Hammerstrom, Battle Ground, WA (US); Lorin Erickson, Brush Praire, WA (US); Todd A Waatti, Battle Ground, WA (US)

(72) Inventors: Wade Hammerstrom, Battle Ground, WA (US); Lorin Erickson, Brush Praire, WA (US); Todd A Waatti, Battle Ground, WA (US)

( * ) Notice: Subject to any disclaimer, the term of this patent is extended or adjusted under 35 U.S.C. 154(b) by 196 days.

(21) Appl. No.: 14/340,415

(22) Filed: Jul. 24, 2014

(65) Prior Publication Data

US 2015/0031254 A1  Jan. 29, 2015

Related U.S. Application Data

(60) Provisional application No. 61/858,064, filed on Jul. 24, 2013.

(51) Int. Cl.
*B63B 35/79* (2006.01)
*F16B 2/18* (2006.01)

(52) U.S. Cl.
CPC ........... *B63B 35/7926* (2013.01); *B63B 35/793* (2013.01); *F16B 2/185* (2013.01)

(58) Field of Classification Search
CPC ... B63B 35/7926; B63B 35/793; F16B 2/185; B60R 2011/0078; B62K 2206/00
USPC ......... 441/71, 79; 248/231.31, 230.2, 229.21, 248/229.11
See application file for complete search history.

(56) References Cited

U.S. PATENT DOCUMENTS

| | | | | |
|---|---|---|---|---|
| 5,934,963 A | * | 8/1999 | Frizzell | B63B 35/793 114/138 |
| 6,883,812 B1 | * | 4/2005 | Hsieh | A63C 17/06 280/11.16 |
| 6,991,504 B1 | * | 1/2006 | English | B63B 35/793 114/127 |
| 8,096,846 B2 | * | 1/2012 | Posner | B63B 35/793 441/79 |
| 8,764,502 B2 | * | 7/2014 | McCredie | B63B 35/793 441/79 |
| 9,090,318 B2 | * | 7/2015 | Koelling | A43C 15/161 |
| 2002/0111094 A1 | * | 8/2002 | Jensen | A43B 5/08 441/75 |

* cited by examiner

*Primary Examiner* — Andrew Polay
(74) *Attorney, Agent, or Firm* — Rylander & Associates, PC; Philip R. M. Hunt

(57) ABSTRACT

A quick detachable fin hold system for quickly removing and changing the fins on kiteboards and wakeboards or the like. Operated by activating a lever that presses against the board surface or another surface attached to the board and pulls against the clip body and the pins attached to the fin. This action positively tightens the fin to the board. To remove simply lift the lever to loosen the assembly, slide the clip body along the slots and the pins pull out of the hole on the clip body and through the holes in the board.

8 Claims, 4 Drawing Sheets

QUICK DETACHABLE FIN HOLD SYSTEM

FIELD OF THE INVENTION

The present invention relates to wakeboard fin attachment systems. More particularly, the present invention relates to quick fin attachment system.

BACKGROUND

A kiteboard or wakeboard will typically have a fin on each corner of the bottom of the board to control the ability of the board to edge through the water. These fins can vary in depth and width depending on the manufacturer and the rider's preference. They are currently attached with a screw from the top through the board and into the fin in a standard bolt pattern. It is becoming increasingly more popular to periodically remove the fins and ride the board "finless". For example in shallow water or along "rails" or slides that are built for the purpose. To currently remove the fins a screwdriver is needed. Using a screwdriver to perform this task takes several minutes per fin. What is needed is a system that could greatly speed up the removal and reattachment of fins.

SUMMARY

The quick detachable fin hold system described herein is a tool-less release mechanism for quickly removing/changing the fins on kiteboards and wakeboards or the like. It is operated by activating a lever that presses against the board surface or another surface attached to the board and pulls against the clip body and the pins attached to the fin. This action positively tightens the fin to the board. To remove simply lift the lever to loosen the assembly, slide the clip body along the slots and the pins pull out of the hole on the clip body and through the holes in the board.

The quick detachable fin hold system greatly speeds up the removal and reattachment of fins. The quick detachable fin hold system also helps prevent the loss of small parts, such as screws and washers, especially when working in a beach environment. With the quick detachable fin hold system there are only two parts for each corner—the fin and the clip body.

The quick detachable fin hold system allows the rider to easily remove the fin from the rider's kiteboard even with the kite still flying. Also using the standard hole spacing allows the rider to easily interchange a variety of fins he or she has between different boards if desired. This could promote experimenting with different fin styles or none at all, whichever the rider prefers at that time.

Wakeboards also have similar problems and the same screw pattern as do kiteboards. With the quick detachable fin hold system it would also allow the individual rider to quickly remove and install the preferred fin in the event that there are multiple riders taking turns using a single board in quick succession, as is frequently the case with wakeboards.

BRIEF DESCRIPTION OF THE DRAWINGS

The present invention will be described by way of exemplary embodiments, but not limitations, illustrated in the accompanying drawings in which like references denote similar elements, and in which.

The accompanying drawings, which are incorporated into and constitute a part of this specification, illustrate one or more embodiments of the invention and, together with the detailed description, serve to explain the principles and implementations of the invention.

DETAILED DESCRIPTION

Figure 1:
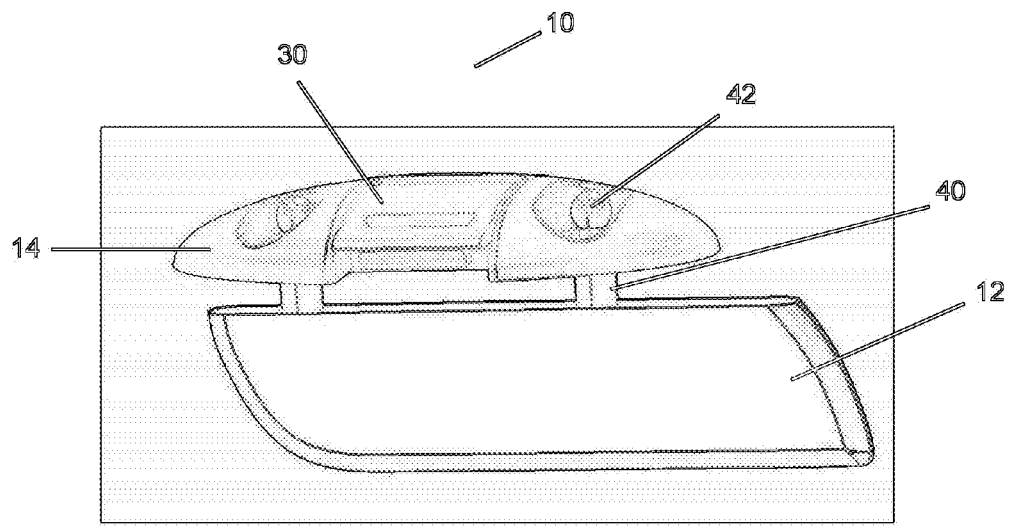
FIG. 1 is a side perspective view of a first embodiment of a quick detachable fin hold system.
Figure 2:
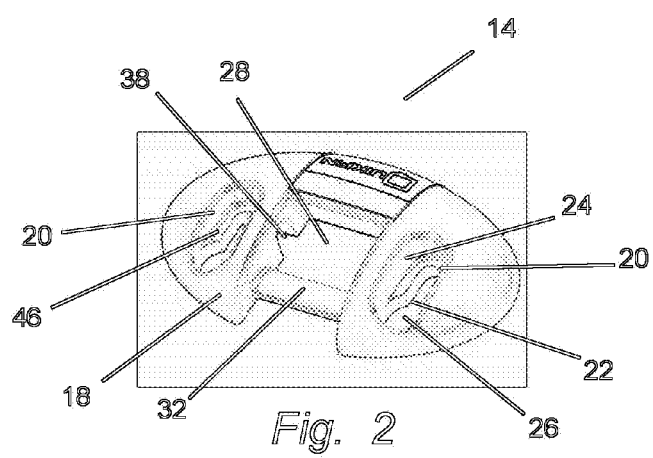
FIG. 2 is a top perspective view of a clip body in the first embodiment of the quick detachable fin hold system.
Figure 3:
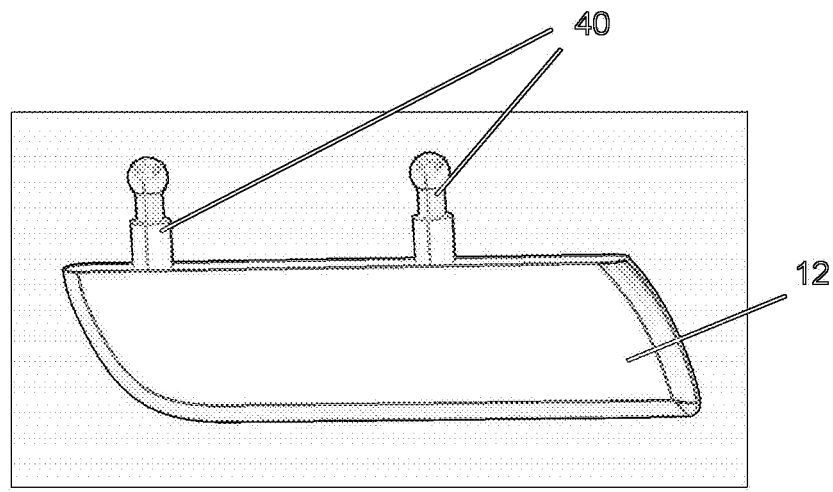
FIG. 3 is a side view of a fin in the first embodiment of the quick detachable fin hold system.
Figure 4:
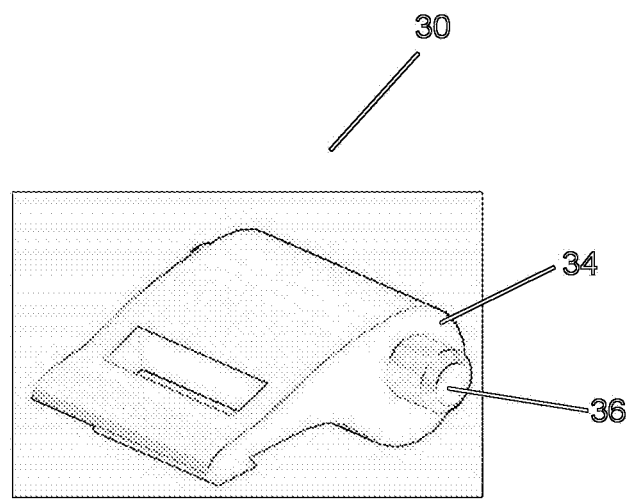
FIG. 4 is a top perspective view of a lever in the first embodiment of the quick detachable fin hold system.
Figure 5:
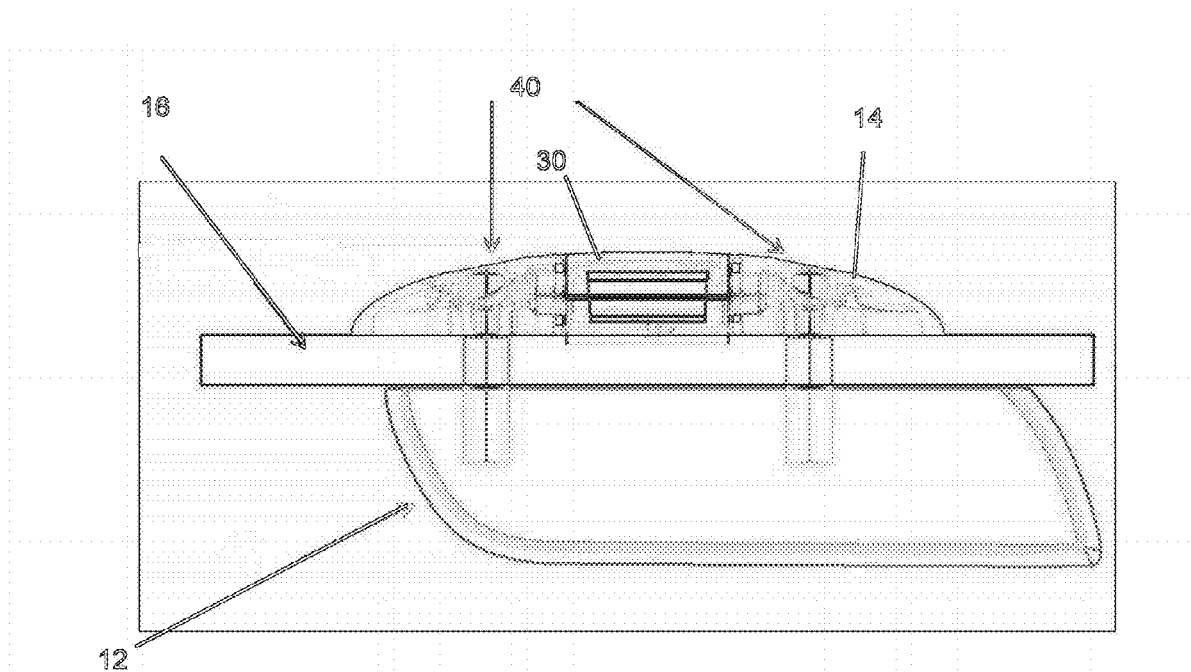
FIG. 5 is a side cross-section view of the first embodiment of the quick detachable fin hold system.
Figure 6:
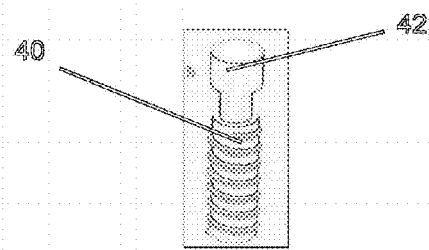
FIG. 6 is a perspective view of a pin of the first embodiment of the quick detachable fin hold system.
Figure 7:
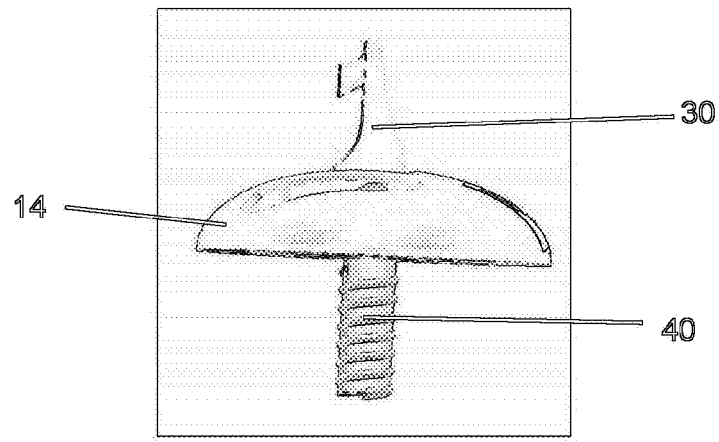
FIG. 7 is a side view of the first embodiment of the quick detachable fin hold system.

Before beginning a detailed description of the subject invention, mention of the following is in order. When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Use of directional terms such as "upper," "lower," "above," "below", "in front of," "behind," etc. are intended to describe the positions and/or orientations of various components of the invention relative to one another as shown in the various Figures and are not intended to impose limitations on any position and/or orientation of any embodiment of the invention relative to any reference point external to the reference.

FIGS. 1-5 show a first embodiment of a quick detachable fin hold system 10. In this first embodiment the quick detachable fin hold system comprises a fin 12 and a clip body 14. The clip body 14 is made of injected plastic or aluminum and is approximately 1½" wide by 2¾" long and ⅜" tall and oval shaped. In other embodiments, the clip body 14 may be of different materials and have different dimensions and shape. The clip body 14 is configured to be place on the top of a board 16 (see FIG. 5) with a front 18 of the clip body 14 facing a side of the board 16. The clip body 14 is comprised of two slots 20 that are 1½ inches apart that are parallel to each other and perpendicular to a centerline of the width of the clip body 14. This arrangement is compatible with the standard screw hole pattern on most kiteboards and wakeboards. In embodiments intended for use with non-standard boards, the spacing of the two slots may differ from the 1½ inch spacing, depending on the board manufacturer. Each slot 20 has a bottom portion 22 slightly larger than ⅛" in width and up to ⅝" in length. Each slot 20 starts from 3/16" behind the width centerline of the clip body 14 and continues to ⅝" in front of the width centerline. The bottom portion 22 of the slot 20 is ⅛" deep. Each slot 20 has a top portion 24 that is 5/16" wide by up to ¾" in length with a 5/32" radius at each end. At the front end of each slot 20 is a 5/32" radius pin hole 26 the running the depth of the slot 20. A sill 46 is defined in the clip body 14 by the top portion 24 of the slot 20 and the narrower bottom portion 22 of the slot 20. In the first embodiment, the sill 46 is ⅛" thick.

The center of the clip body 14 has a void 28 that is ¾" wide by 1" in length starting from the front of the clip body 14. The void 28 is configured to accept a lever 30. A bridge 32 is left on the clip body 14 across the void 28 for structural support and a stopping point for the lever 30. The bridge 32 is approximately ⅛" back from the front of the clip body 14 and is ¼" wide by ⅛" tall and runs parallel with width center line of the clip body 14.

Lever 30 is a separable part of the clip body 14. Lever 30 is ⅞" long, ¾" wide, and has a ⅜" diameter cam 34 on one end. The cam 34 has ⅛" diameter by ⅛" long male ends 36 on each end that fit into a female matching ⅛" diameter cam retention hole 38 on the clip body 14 enabling the lever 30 to rotate approximately 120 degrees within the clip body 14. The lever 30 is assembled together with the clip body 14 by inserting it through the void 28 from the bottom of the clip body 14 and the male ends 36 and snapping into the cam retention holes 38 on the clip body 14. When closed, the lever 30 rests on the bridge 32 and snaps over rounded bumps that protrude from the clip body 14 in the void 28 locking the lever 30 in place. The dimensions of the lever 30 can vary slightly depending on the embodiment. The lever 30 may be made of injection molded plastic or aluminum.

The fin 12 has two pins 40. The pins 40 may be made integral with the rest of the fin 12 or the pins 40 may be made separately and attached to the rest of the fin 12. In the first embodiment, the pins 40 are machined steel or aluminum 1" to 1¼" long with a ¼-20 thread pattern running the length of the pin starting 5/16" from the top of the pin. The head 42 of the pin 40 is ¼" diameter by 3/16" and is smooth or knurled. Below the head 42, the pin 40 has a neck 44 that has a smaller cross-section than the head 42. In the first embodiment, the neck 44 is machined to a diameter of ⅛" for a distance of 3/16 of an inch. The pins 40 are hand threaded into the ¼-20 threads in the fin 12. The pins 40 can be inserted through standard fin screw holes in a board. The neck 44 of the pin 40 is designed to ride along the slots 20 on the clip body 14.

The quick detachable fin hold system 10 can be adjusted to varying board thicknesses by threading or unthreading one or both of the pins 40. In embodiments with a metric M6 thread pin the head 42 of the pin 40 is the diameter of the M6 thread. The pins 40 may be adjusted in relation to the clip body 14 such that when the lever 30 is locked into place in the closed position on the clip body 14, the cam 34 on the lever 30 exerts enough force against the top of the board to pull the fin 12 against the bottom of the board, locking the fin 12 into place. To detach the fin 12, the lever 30 is released by pulling upwards, which rotates the cam 34 away from the board, loosening the clip body 14 from the fin 12. The clip body 14 is then slid back, moving the slots 20 relative to pins 40 until the pins 40 are at the front of the slots 20 where the pin holes 26 are. The pin holes 26 are slightly larger than the pin in cross-section, allowing the clip body 14 to detach and the pins 40 attached to the fin 12 to be pulled back through the holes in the board.

Figure 8:
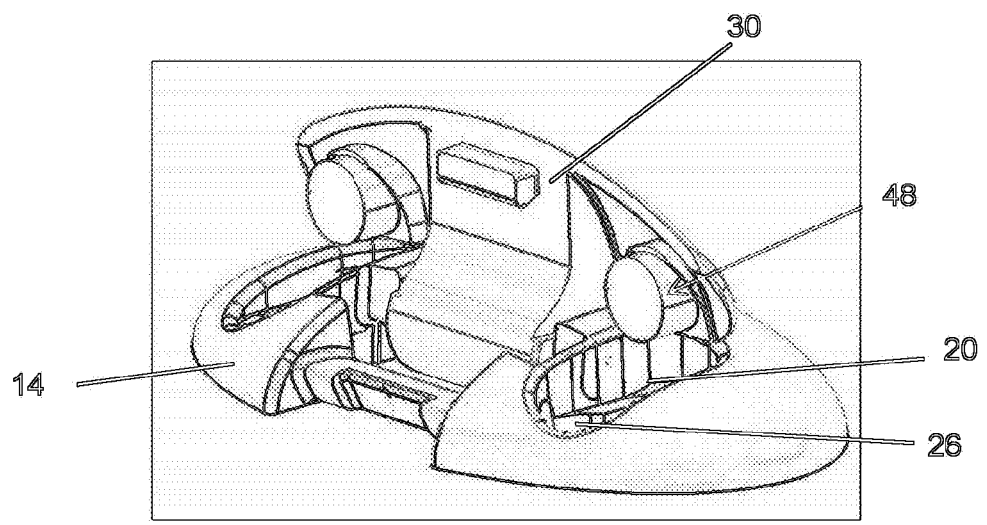
FIG. 8 is a top perspective view of a second embodiment of a quick detachable fin hold system, with a positive locking design.

FIG. 8 is a top perspective view of the body clip 14 of a second embodiment of a quick detachable fin hold system, with a positive locking design. In this second embodiment, the body clip 14 has a lever 30 that has plugs 48 attached to the underside of the lever 30. When the lever 30 is closed, the plugs 48 nest inside pin holes 26. This blocks the pins 40 from moving from the back of the slots 20 to the pin holes 26 in the front of the slots 20. When the lever 30 is in its closed position, the pins 40 are primarily held in place in the back of the slots by friction against the sills 46. The plugs 48 provide an extra degree of security.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

What is claimed is:

1. A quick detachable fin hold system comprising:
   a fin with at least two pins configured for penetrating through at least two holes in a board;
   wherein the two pins each have a head and a neck, with the neck smaller in cross-section than the head;
   a clip body with at least two slots configured for accepting and engaging the pins therein;
   wherein the two slots each have a top portion and a bottom portion, a front end and a back end;
   wherein the top portion of each of the two slots is wider than the heads of the two pins;
   wherein the bottom portion of each of the two slots is narrower than the heads of the two pins, except for a pin hole at the front end of each of the two slots, wherein the pin hole is wider than the heads of the two pins;
   wherein the two slots each have a sill in the bottom portion of the slot at the back end of the slot; and
   a lever with a cam, the cam configured for rotating within a void in the clip body, applying pressure to the board when the lever is moved to a closed position, releasing pressure from the board when the lever is moved to an open position.

2. The quick detachable fin hold system of claim 1:
   wherein the two slots are separated by an inter-slot distance; and
   wherein the fin has two pins separated by an inter-pin distance equal to the inter-slot distance.

3. The quick detachable fin hold system of claim 1:
   wherein the inter-pin distance and the inter-slot distance are 1½ inches.

4. The quick detachable fin hold system of claim 1:
   wherein the lever has one or more plugs coupled to an underside of the lever, the plugs configured for nesting within the pin holes of the clip body when the lever is in the closed position.

5. The quick detachable fin hold system of claim 1:
   wherein the lever is configured for engaging with protrusions on the clip body, thereby locking the lever and inhibiting its rotation without significant force applied to the lever.

6. The quick detachable fin hold system of claim 1:
   wherein the lever has male ends configured for fitting into female cam retention holes on the clip body.

7. The quick detachable fin hold system of claim 1:
wherein the two slots are parallel to each other and perpendicular to a centerline of a width of the clip body.

8. The quick detachable fin hold system of claim 1:
wherein the clip body is configured to be placed on top of the board with a front of the clip body facing a side of the board.

* * * * *